United States Patent Office 2,834,739
Patented May 13, 1958

2,834,739

METHOD FOR CONTROLLING GELATION TIME

Hugo G. Becker and Carl W. Streed, Woodbury, N. J., assignors to Socony Mobil Oil Company, Inc., a corporation of New York No Drawing. Application June 25, 1953
Serial No. 364,206

6 Claims. (Cl. 252—448)

This invention relates to the preparation of siliceous hydrogels and, more particularly, is concerned with a new method for adjusting the gelation time of siliceous hydrogels without variance in the pH, solids content or temperature thereof. Specifically, the invention is directed to a method for prolonging gelation time of quick setting siliceous hydrogels of fixed composition without the necessity of resorting to a drastic reduction in temperature of the forming solutions used in the preparation of said hydrogels.

Siliceous hydrogels and gels obtained upon drying the same have long been known. Silica gel has been used as a desiccant. Siliceous gels containing silica and one or more metal oxides have heretofore been recognized as valuable in catalytically promoting hydrocargon conversion reactions. Thus, siliceous cracking catalysts ordinarily contain silica and one or more hydrous metal oxides. Active synthetic cracking catalysts are generally gels including silica-alumina, silica-zirconia, silica-beryllia, and silica-magnesia, as well as ternary combinations, such as silica-alumina-zirconia, silica-alumina-beryllia, and silica-alumina-magnesia. Ordinarily, this type of catalyst contains silica and at least one material selected from the group alumina, zirconia, beryllia, and magnesia. Other metal oxides may also be present if desired, generally in small percentage, such as the oxides of manganese, chromium, titanium, tungsten, molybdenum, and calcium. Siliceous gels have also found use as supports for other catalytic material of a nature appropriate to the result desired. Thus, silica gel has been impregnated with a variety of metals, metal salts, hydroxides, and oxides to yield catalytically useful composites.

Siliceous hydrogels may be prepared by various procedures including hydrolysis of ethyl ortho-silicate and acidification of an alkali metal silicate. The former method is particularly applicable where it is desired to prepare hydrogels initially free of zeolitic alkali metal. The latter method, however, has been more widely used in the industry and, in particular, siliceous hydrogels have been obtained by acidification of sodium silicate. In the preparation of such hydrogels, a hydrosol containing silica, together with any desired hydrous metal oxides, is initially formed and the hydrosol, after a suitable lapse of time, sets to a hydrogel. The time required for the hydrosol to set to the hydrogel has been designated as the time of set or gelation time. Such gelation time has heretofore been controlled by adjusting the pH or temperature of the hydrosol or the solids content thereof, the latter being, in turn, dependent on the concentration of reactant solutions employed in formation of the hydrosol. Thus, in the preparation of siliceous hydrogels, the higher the temperature, the shorter the time of gelation. Likewise, with an increase in solids content of the hydrogel, the shorter is the time of gelation. The effect of pH on the time of gelation is dependent upon the particular pH range being considered. Thus, it is known that silica hydrogels have a short time of gelation at a pH in the approximate range of —1 to 0 and likewise have a short time of set at a pH in the approximate range of 7 to 9. Intermediate these two pH ranges, the time of gelation for silica hydrogel increases and may extend over an extremely long period of the order of days. Accordingly, it has heretofore been known to vary the time of gelation of siliceous hydrogels by adjustment in the temperature, pH, or solids content. As a practical matter, however, where it is ordinarily desired, as in commercial operation to produce a hydrogel of fixed composition by reaction of define amounts of appropriate hydrogel-forming solutions, the solids content and pH of the hydrogel, being governed by the fixed composition, remain constant, leaving temperature variation as the sole means for controlling gelation time. Thus, for slow-setting hydrogels where it is desired to speed up gelation time, it has heretofore been necessary to heat the hydrogel-forming solutions. Conversely, for quick-setting hydrogels, where it is desired to prolong gelation time, it has heretofore been essential to refrigerate the hydrogel-forming solutions in order to adjust gelation time to the desired interval. The degree of cooling and, consequently, the extent of variation in gelation time capable of being achieved by this procedure is restricted, however, to temperatures in excess of the freezing points of the hydrosol forming solutions. To provide a reasonable factor of safety in commercial operation, the temperature of the forming solutions should not be lowered to less than about 5° F. above the freezing point of the forming solutions. As a practical illustration, the freezing points of hydrogel forming solutions used in preparation of a commercial silica-alumina hydrogel are ordinarily between 28° F. and 29° F. In order to afford reasonable safety in preventing freezing, the solutions in commercial operation are not cooled below 35° F. Consequently, there has been a limitation on control of gelation time by temperature variation. In addition, as will be evident, reduction in temperature of the hydrogel forming solutions to prolong gelation time, as well as an increase in temperature of the hydrogel-forming solutions to decrease gelation time, has necessitated the respective use of either refrigeration or heating equipment which, in turn, has placed an economic burden on the method, effecting an increase in the overall cost in hydrogel production.

It is an object of the present invention to provide a feasible means for adjusting gelation time of siliceous hydrogels without resorting to change in temperature, pH or solids content. A still further object is to afford a method for prolonging gelation time of quick setting hydrogels without resorting to drastic reduction in temperature of the hydrogel-forming solutions. A still further object is the provision of a method for decreasing gelation time of slow setting hydrogels without resorting to the necessity for a large increase in the temperature of the hydrogel-forming solutions. A very important object of this invention is to provide a suitable method for adjusting the time of set of quick-setting hydrogels wherein hydrosol globules are introduced into a water-insoluble medium and set therein to spheroidal hydrogel beads before passing into a layer of water maintained below said medium.

The above and other objects which will be apparent to those skilled in the art are achieved by the process described herein. In accordance with the present procedure, it has been discovered that the gelation time of siliceous hydrogels can be controlled without variance in pH, temperature, or solids content. The process of this invention comprises a method for controlling gelation time of a siliceous hydrogel prepared by acidification of an alkali metal silicate by inversely varying the concentration of the alkali metal silicate reactant solution and the concentration of the acidic reactant solution to afford a resulting hydrogel of fixed solids content, the pH and temperature of the hydrosol and resulting hydrogel remaining constant. Thus, it has been discovered, in accordance with the present invention that the time of gelation of a siliceous hydrosol may be increased by decreasing the concentration of $SiO_2$ in the alkali metal silicate reactant solution with a corresponding increase in the acidic reactant solution to afford a resulting hydrogel of fixed solids content. Alternately, the time of gelation of a siliceous hydrosol may be decreased by increasing the concentration of $SiO_2$ in the alkali metal silicate reactant solution with corresponding decrease in the concentration of acidic reactant solution to yield a hydrogel of fixed solids content.

The acidic reactant solution employed in the present process may be a solution of an acid, an acid salt, or an acid solution of one or more metal salts, the oxides of which metals it is desired to incorporate in the resulting hydrosol. Thus, where silica gel is desired, the acidic reactant solution is an aqueous solution of an acid, usually although not necessarily a mineral acid. Where a plural oxide gel of silica and one or more hydrous metal oxides is desired, the acidic reactant solution comprises an acid and one or more metal salts soluble in said acid. For example, in the preparation of a silica-alumina hydrogel, the acidic reactant solution is suitably an aqueous sulfuric acid solution of an aluminum salt, such as aluminum sulfate. The alkali metal silicate reactant solution may comprise any of the readily available alkali metal silicates, including sodium silicate and potassium silicate. Generally, sodium silicate, being readily available and relatively inexpensive, is preferred as the alkali metal silicate reactant.

In accordance with the present process, the acidic reactant solution and the alkali metal silicate reactant solution are intimately combined, for example, in a mixing nozzle or other suitable means wherein rapid admixture between the two reactant solutions is effected. The temperature and pH of the hydrosol produced remain constant as does the solids content thereof. The time of gelation is adjusted in accordance with the present invention by control of the concentration of $SiO_2$ in the alkali metal silicate reactant solution with corresponding control in the concentration of the acidic reactant solution to yield a hydrosol of fixed solids content. Control of the concentration of $SiO_2$ in the alkali metal silicate reactant solution is readily achieved by the amount of water initially added to the alkali metal silicate with corresponding adjustment of the amount of water added to the acidic reactant solution so that the solids content of the resulting hydrogel remains unchanged.

A practical embodiment of the present invention resides in the manufacture of inorganic oxide gels in the form of spheroidal particles. A number of processes for making spheroidal gel particles have heretofore been described in the art. One well known method described in patents to Marisic, such as U. S. 2,384,946, involves the preparation of a gelable inorganic oxide hydrosol characterized by a relatively short time of gelation. The hydrosol is admitted in the form of separate globules, preferably after flowing over a distributing cone, such as described in U. S. 2,446,783, into a tower containing a body of oil or other water-immiscible fluid in which the globules assume a spheroidal shape and set to a hydrogel. A water layer at the bottom of the forming tower serves to separate oil from the freshly formed hydrogel. The spheroidal hydrogel particles so obtained may be washed, base-exchanged, heat treated, or otherwise processed to obtain the desired physical and chemical characteristics in the final product. The successful production of spheroidal hydrogel particles by the above method is dependent upon close control of the gelation time. The time of gelation is necessarily sufficiently long to afford the production of whole hydrogel beads of uniform composition and shape. Thus, a gelation time of approximately 3 seconds or less was found to result in rapid fouling of the mixing nozzle and distributing cone, whereas a gelation time of approximately 6 seconds or longer permitted partially gelled material to enter and disperse in the water phase of the forming tower. For this particular operation, accordingly, it was necessary that the gelation time be so controlled as to be within the approximate range of 3 to 6 seconds. One expedient heretofore employed in controlling the gelation time of the hydrosol globules has been to lower the temperature of the alkali metal silicate reactant solution and acidic reactant solution while maintaining the solids concentration and pH of the solutions constant. Thus, with a decrease in temperature of the forming solutions, an increase in gelation time is obtained. Such method of operation, however, has entailed refrigeration of the hydrosol forming solutions which, in turn, has involved a need for refrigeration equipment and has increased the overall cost of production of the desired spheroidal particles of hydrogel.

By following the procedure of the present invention, wherein the gelation time of the hydrosol is varied by inversely varying the concentrations of the alkali metal silicate reactant solution and the acidic reactant solution without varying the solids content of the resulting hydrosol, hydrogels of appreciably increased gelation time can be obtained at substantially higher temperatures, affording considerable savings in refrigeration costs as a result of less drastic chilling of the hydrosol forming solutions. Thus, following the procedure of controlling gelation time in accordance with the present invention, a considerably longer time of gelation may be obtained at a given temperature without varying the solids content or pH of the hydrosol.

Having described in a general way the nature of this invention, it may be more readily understood by a consideration of the following illustrative but non-limiting examples set forth below:

EXAMPLE 1

A silica-alumina-chromic oxide hydrosol was prepared by mixing 1.00 volume of a solution of sodium silicate containing 13.9 percent silica ($SiO_2$), 4.3 percent sodium oxide ($Na_2O$), and 81.8 percent water with 1.02 volumes of an acidic solution containing 3.69 percent aluminum sulfate, 2.66 percent sulfuric acid, 0.09 percent chromic sulfate, and 93.56 percent water. The resulting colloidal solution was ejected from a nozzle in the form of globules into a column of mineral oil, the depth of which was about 8 feet. The oil was characterized by a specific gravity of 0.860 and a viscosity (S. U. V.) at 60° F. of 280 seconds. The globules of solution fell through the oil and gelled before passing into a layer of water located beneath the oil. With the temperature of the forming solutions maintained at 54° F., the time of gelation was 4.7 seconds. When the temperature of the forming solutions was 61° F., the time of gelation was 3.6 seconds. The pH of the resulting hydrogel was 8.4. The spheroidal particles of hydrogel were sluiced out of the bottom of the column into a tank of water maintained at a temperature of about 120° F. They remained there for a period of about 9 hours and, on removal from the hot water, were base-exchanged with an aqueous solution of aluminum sulfate and ammonium sulfate. After base exchange, the hydrogel particles were water-washed free of soluble salts. The hydrogel particles were then slowly and uniformly dried in superheated steam at a temperature of about 300° F. until shrinkage of the hydrogel was substantially complete. The drying was continued at a gradually increasing temperature up to 1300° F., at which temperature the particles were maintained for about 5 hours. The composition of the resulting gel was 89.35 percent $SiO_2$, 9.75 percent $Al_2O_3$, 0.15 percent $Cr_2O_3$, and 0.75 $H_2O$.

A summary of the above example, as well as Examples 2–4, in which hydrogels were prepared following the procedure of Example 1, but with varying concentration of $SiO_2$ in the sodium silicate solution and varying concentration of acid and salts in the acidic reactant solution, are tabulated below:

Table 1

| Example | 2 | | 1 | | 3 | | 4 | |
|---|---|---|---|---|---|---|---|---|
| Forming Conditions: | | | | | | | | |
| Volumetric Ratio Acidic Solution to Silicate Solution | 2.08 | | 1.02 | | 0.54 | | 0.27 | |
| Solution Rates: | | | | | | | | |
| Acidic Solution, cc./min | 624 | | 485 | | 327 | | 198 | |
| Sodium Silicate Solution, cc./min | 363 | | 474 | | 621 | | 728 | |
| Composition of Acidic Solution Wt. percent: | | | | | | | | |
| $Al_2(SO_4)_3$ | 2.68 | | 3.69 | | 5.33 | | 8.42 | |
| $H_2SO_4$ | 2.00 | | 2.66 | | 3.84 | | 6.07 | |
| $Cr_2(SO_4)_3$ | 0.07 | | 0.09 | | 0.13 | | 0.20 | |
| $H_2O$ | 95.25 | | 93.56 | | 90.70 | | 85.31 | |
| Composition of Sodium Silicate Solution, Wt. percent: | | | | | | | | |
| $SiO_2$ | 19.7 | | 13.9 | | 10.9 | | 9.3 | |
| $Na_2O$ | 6.1 | | 4.3 | | 3.4 | | 2.9 | |
| $H_2O$ | 74.2 | | 81.8 | | 85.7 | | 87.8 | |
| Temperature of Hydrosol | 47.5 | 60.0 | 54.0 | 61.0 | 55.5 | 61.0 | 54.5 | 61.0 |
| Hydrosol Gelling Time, Secs | 4.5 | 2.9 | 4.7 | 3.6 | 5.0 | 4.3 | 6.2 | 4.5 |
| pH of Hydrogel Produced | 8.4 | | | | | | | |
| Composition of Finished Gel: | | | | | | | | |
| $SiO_2$ | 89.35 | | | | | | | |
| $Al_2O_3$ | 9.75 | | | | | | | |
| $Cr_2O_3$ | 0.15 | | | | | | | |
| $H_2O$ | 0.75 | | | | | | | |

It will be seen, from a comparison of the results of Examples 2 and 4, where the pH was maintained at 8.4 and the temperature of the forming solutions was maintained at approximately 60° F., that the gelation time rose from 2.9 seconds to 4.5 seconds with a decrease in the $SiO_2$ concentration of the sodium silicate forming solution and with a corresponding increase in the concentration of acidic solution so as to afford a resulting hydrogel of identical solids content. This represents an increase of 55 percent in gelation time. Conversely, if it is desired to decrease time of gelation, the concentration of $SiO_2$ in the sodium silicate reactant solution is increased with a corresponding decrease in concentration of the acidic reactant solution to afford a hydrosol of fixed solids content.

While the method described herein is particularly feasible for controlling the gelation time of quick-setting siliceous hydrosols such as employed in the formation of spheroidal hydrogel particles, the present method is generally applicable to the preparation of siliceous hydrogels involving reaction between an alkali metal silicate solution and an acidic solution under conditions such that a siliceous hydrogel is obtained. Thus, it is within the purview of this invention to prepare silica hydrogels or plural oxide hydrogels containing a substantial amount, say at least about 5 percent by weight, of silica in combination with one or more hydrous metal oxides with adjustment in gelation time thereof without variation in pH, temperature or solids content.

Without being limited by any theory, it is believed that the method of controlling gelation time in accordance with the present invention is a function of the size of the micelles of the alkali metal silicate solution employed as a reactant. It is known that sodium silicate is a colloidal solution wherein the size of the micelles is dependent on concentration. With a more concentrated solution, it is thought that the micelles are of a correspondingly greater size and that the rate of reaction of the alkali metal silicate solution having micelles of increased size is increased since the introduction of the second acidic reactant solution has a greater opportunity to react with the larger silicate micelles.

We claim:

1. In a process for preparing a siliceous hydrogel by intimately admixing an aqueous alkali metal silicate solution and an aqueous acidic solution under conditions of constant pH and temperature to yield a siliceous hydrosol which inherently undergoes gelation after lapse of time to a hydrogel of unvarying composition, the improvement which comprises controlling the gelation time of said hydrogel without change in the solids content thereof by inversely varying the concentration of said aqueous alkali metal silicate solution, without variation in the alkali metal oxide to silica ratio thereof, and the concentration of said aqueous acidic solution by adjusting the relative water contents of the solutions while maintaining the volumetric ratio of acidic solution to alkali metal silicate solution between about 0.27 and about 2.08.

2. In a process for preparing a siliceous hydrogel by intimately admixing an aqueous alkali metal silicate solution and an aqueous acidic solution under conditions of constant pH and temperature to yield a siliceous hydrosol which inherently undergoes gelation after lapse of time to a hydrogel of unvarying composition, the improvement which comprises increasing the gelation time of said hydrogel without change in the solids content thereof by decreasing the concentration of said aqueous alkali metal silicate solution without variation in the alkali metal oxide to silica ratio thereof with compensating increase in the concentration of said aqueous acidic solution by adjusting the relative water contents of the solutions while maintaining the volumetric ratio of acidic solution to alkali metal silicate solution between about 0.27 and about 2.08.

3. In a process for preparing a siliceous hydrogel by intimately admixing an aqueous alkali metal silicate solution and an aqueous acidic solution under conditions of constant pH and temperature to yield a siliceous hydrosol which inherently undergoes gelation after lapse of time to a hydrogel of unvarying composition, the improvement which comprises decreasing the gelation time of said hydrogel without change in the solids content thereof by increasing the concentration of said aqueous alkali metal silicate solution without variation in the alkali metal oxide to silica ratio thereof with compensating decrease in the concentration of said aqueous acidic solution by adjusting the relative water contents of the solutions while maintaining the volumetric ratio of acidic solution to alkali metal silicate solution between about 0.27 and about 2.08.

4. In a process for preparing siliceous hydrogel in the form of spheroidal particles wherein siliceous hydrosol resulting from intimate admixture of an aqueous alkali metal silicate solution and an aqueous acidic solution under conditions of constant pH and temperature is introduced in the form of globules into a water-immiscible medium and sets therein to a hydrogel of unvarying composition, the improvement which comprises controlling the gelation time of said hydrogel particles without change in the solids content thereof by inversely varying the concentration of said aqueous alkali metal silicate solution, without variation in the alkali metal oxide to silica ratio thereof, and the concentration of said aqueous acidic solution by adjusting the relative water contents of the solutions while maintaining the volumetric ratio of acidic solution to alkali metal silicate solution between about 0.27 and about 2.08.

5. In a process for preparing siliceous hydrogel in the form of spheroidal particles wherein siliceous hydrosol resulting from intimate admixture of an aqueous alkali metal silicate solution and an aqueous acidic solution under conditions of constant pH and temperature is introduced in the form of globules into a water-immiscible medium and sets therein to a hydrogel of unvarying composition, the improvement which comprises increasing the gelation time of said hydrogel without change in the solids content thereof by decreasing the concentration of said aqueous alkali metal silicate solution, without variation in the alkali metal oxide to silica ratio thereof, with compensating increase in the concentration of said aqueous acidic solution by adjusting the relative water contents of the solutions, while maintaining the volumetric ratio of acidic solution to alkali metal silicate solution between about 0.27 and about 2.08.

6. In a process for preparing siliceous hydrogel in the form of spheroidal particles wherein siliceous hydrosol resulting from intimate admixture of an aqueous alkali metal silicate solution and an aqueous acidic solution under conditions of constant pH and temperature is introduced in the form of globules into a water-immiscible medium and sets therein to a hydrogel of unvarying composition, the improvement which comprises decreasing the gelation time of said hydrogel without change in the solids content thereof by increasing the concentration of said aqueous alkali metal silicate solution without variation in the alkali metal oxide to silica ratio thereof with compensating decrease in the concentration of said aqueous acidic solution by adjusting the relative water contents of the solutions while maintaining the volumetric ratio of acidic solution to alkali metal silicate solution between about 0.27 and 2.08.

References Cited in the file of this patent

UNITED STATES PATENTS

| 2,528,767 | Marisic | Nov. 7, 1950 |
| 2,647,875 | Marisic | Aug. 4, 1953 |

OTHER REFERENCES

J. Phys. Chem., vol. 29 of 1925, pp. 241–248, 23, 182.

Gelation Times of Various Silica Sols, by Spencer et al., Ind. Eng. Chem., May 1951, pp. 1129–32.